Dec. 15, 1964  J. T. PERRY ETAL  3,161,812
VACUUM VARIABLE CAPACITOR
Filed Feb. 4, 1963
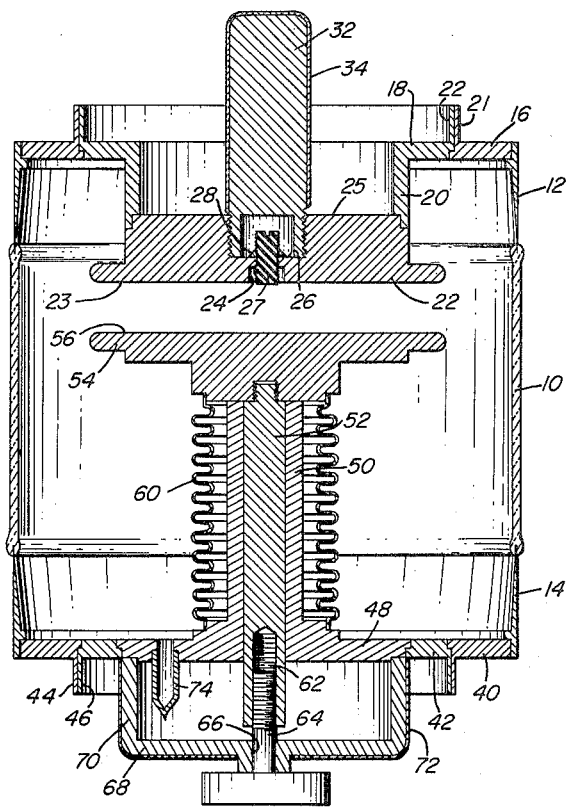
JOHN T. PERRY
CHESTER S. KAWIECKI
INVENTORS.
BY
BUCKHORN, BLORE, KLARQUIST & SPARKMAN
ATTORNEYS

United States Patent Office 3,161,812
Patented Dec. 15, 1964

3,161,812
VACUUM VARIABLE CAPACITOR
John T. Perry, Melrose Park, and Chester J. Kawiecki, Chicago, Ill., assignors to Joslyn Mfg. and Supply Co., Chicago, Ill., a corporation of Illinois
Filed Feb. 4, 1963, Ser. No. 255,738
4 Claims. (Cl. 317—245)

The present invention relates to a variable, vacuum capacitor.

It is an object of the present invention to provide a variable, vacuum capacitor of rugged construction in which the components are of high strength and resistant to distortion or breakage.

Another object of the invention is to provide a vacuum capacitor which will remain operative under severe vibrational and shock conditions.

Still another object of the invention is to provide a variable, vacuum capacitor that is of simple construction enabling its manufacture easily and at low cost.

A still further object of the invention is to provide a vacuum capacitor of such design that it may be operated continuously under high power loads without failure.

Still other objects and advantages of the invention will become more apparent hereinafter.

In accordance with the illustrated embodiment, the present invention comprises a vacuum capacitor including an evacuated envelope including a tubular side wall portion of glass or other suitable insulating material. Fixedly mounted coaxially in the envelope at one end thereof is a circular capacitor plate having a broad, flat face. Opposing such fixed plate is a coaxial, circular movable plate also having a broad flat face which is parallel to the face of the stop 27 when the electrode spacing is in the the envelope by a bellows whereby such plate may be moved toward and away from the fixed plate so as to vary the capacitance between the same. Suitable means are provided to effect movement of the movable plate.

For a more detailed description of the invention reference is made to the accompanying drawing in which is shown a preferred embodiment of the invention in longitudinal section.

Referring now to the drawing, the illustrated embodiment of the invention comprises an evacuated envelope including a tubular portion 10 of glass or other suitable dielectric material and having a length sufficient to prevent breakdown under the voltages applied to the structures supported therefrom. Sealed to the opposite ends of the wall portion 10 are end wall structures including tubular glass-to-metal seal elements 12, 14 which preferably are of copper to minimize heating thereof in the presence of high frequency fields but which elements may be of nickel-steel, Kovar or other suitable material. Secured at its outer edge to the glass-to-metal seal element 12 by brazing or the like is a mounting member including an annular, disk-like portion including an outer ring 16 and an inner ring 18 formed with an integral inwardly projecting flange portion 20. The rings 16, 18 are preferably of Monel or similar corrosion resistant material and are provided with meeting flanges 21, 22, respectively, which may be heliarc welded together to form a vacuum tight joint therebetween.

A fixed, circular capacitor plate 22 is secured by brazing or other suitable method to the inner end of the flange portion 20. The plate 22 is preferably formed as a relatively massive body of copper or other suitable conductive material, such as aluminum. The plate 22 has flat, parallel opposed faces, the inner face 23 of the plate 22 being provided with a smooth walled, coaxial counterbore 24 and the outer face 25 being provided with a threaded counterbore 26. Mounted coaxially in the plate 22 is a stop element 27 formed of a ceramic or other suitable dielectric. Preferably the stop 27 is threaded in the plate 22 and, as shown, is adapted to project slightly beyond the plane of the inner face 23 of the plate for a purpose to be described. The counterbore 24 is for the purpose of providing a lengthened breakdown path along the surface of the stop 27 when the electrode spacing is in the minimum position. After adjustment of the position of the stop 27 during assembly of the capacitor it is fixed in position and a vacuum tight seal formed by a bead 28 of brazing material laid down around the stop at the bottom of the counterbore 26.

A connector element or post 32 is threaded into the counterbore 26. Preferably the post 32 is of copper or other material having good electrical conductivity and also is preferably provided with a coating of silver indicated at 34 to provide minimum contact resistance between the post and an electrical conductor connected thereto.

A mounting member is also secured to the glass-to-metal seal element 14, such member comprising an outer ring 40 of Monel or other suitable material. An inner ring 42 also of Monel is secured to the outer ring 40, the rings 40, 42 having meeting flanges 44, 46, respectively, that are heliarc welded together. Secured to the inner edge of the inner ring 42 by brazing or the like is a guide element, of copper so as to provide a good conductive path and comprising a circular base portion 48 and an elongated, tubular guide portion 50 which extends inwardly of the envelope. A support rod 52 of conductive but thermally stable material such as, for example, brass is slidably received in the guide portion 50, the rod being secured to the base of a movable capacitor plate 54 comprising a circular disk-like member having a planar face 56 parallel and opposed to the face 23 of the fixed plate 22. Since the envelope wall portion 10 must be relatively long to resist breakdown, the guide portion 50 likewise must be relatively long and sturdy so as to provide rigid support for the movable plate 54 which is spaced relatively closely to the fixed plate 22. Extending between the base of the capacitor plate 54 and the base 48 of the support member is a bellows 60 which is hermetically sealed at its opposite ends to the plate and support member base. Preferably the bellows 60 is formed of Monel metal or other fatigue and corrosion resistant material.

The outer end of the electrode support rod 52 is provided with a threaded bore 62 for receiving an adjustment screw 64 which is rotatably received in the central aperture 66 of a copper cap 68 comprising a cup-shaped member having a tubular sidewall 70 brazed or otherwise secured in good electrical contact to the base portion 48. Preferably the periphery of the cap sidewall is provided with a coating of silver 72 so that electrical contact may be made therewith with a minimum of electrical resistance.

An exhaust tubulation 74 is provided through the base member 48 through which exhaustion of the envelope is made prior to the mounting of the cap 68.

In the assembly of the device the glass portion 10, the glass-to-metal seal elements 12, 14 and rings 16, 40 are assembled as a unit. Also assembled as a unit is the capacitor plate 22 and mounting member 18. The stop 27 is preferably preadjusted and brazed in position prior to assembly of this unit with the other units of the capacitor. Still another unit is formed comprising the mounting ring 42; the support member 48, 50; the capacitor plate 54; the electrode support rod 52 and the bellows 60. Thereafter the respective capacitor plate assemblies are inserted in position within the enevelope structure and the flanges 21, 22 and 44, 46, respectively, heliarc welded together while the assemblies are held in jigs to maintain the assemblies in position with the opposed capacitor plate surfaces 23, 56 in parallel relation. Thereafter the envelope is exhausted through the tubulation 74 while the parts are heated by suitable means so as to drive off any occluded gases. When the exhaustion has been completed the tubulation 74 is sealed, the cap 68 is mounted in position and the screw 64 inserted through the opening 66 and threaded into the bore 62. Electrical connection is made through suitable connectors attached to the post 32 and cap 68.

As will be apparent, the external air pressure will urge the movable capacitor plate 54 in the direction towards the fixed plate 22. The head of the adjusting screw 64 in engagement with the cap 68 will serve as a stop member to limit the inward movement of the movable plate 54 pursuant to the position of adjustment of the screw 64. By rotating the screw 64 the plate 54 can be moved towards or away from the fixed plate 22 to change the capacitance of the device. The stop element 27 serves as a positive stop to prevent physical contact and resulting short circuiting between the plates 22, 54. As will be apparent the surfaces 23, 56 should be as smooth and free as possible from projections of any kind to prevent corona discharge between the plates. For the same reason the peripheries of the plates 22, 54 are rounded as shown.

The unitized assembly which the construction of the capacitor permits enables accurate alignment of the plate surfaces 23, 56 which is of course necessary to permit bringing the close together to attain maximum capacity values. Furthermore, the large and exposed surfaces of the electrode plates permits rapid dissipation of heat generated by high frequency currents during operation. Because of the relatively large mass of the capacitor plates and the secure manner in which they are supported the device is stable and not subject to damage or misalignment when subjected to vibration, shock and electrostatic forces.

Inasmuch as relatively large changes in the capacity of the device can be obtained by slight changes in the spacing between the plates 22, 54 the bellows 60 will be subjected to a minimum of flexing and fatiguing upon changes in capacitance so that an exceptionally long and useful life of the bellows can be anticipated.

Capacitors of the type illustrated are capable of operating under severe load conditions. A capacitor having flat, parallel, circular plates of, for example, two-inch diameter will have a capacitance of about 350 picofarads, a withstand voltage of about 3000 volts and a current carrying capacity of about 20 amperes at a spacing of about 0.002 inch between the plates. At greater spacings much higher voltages can be tolerated though, of course, the capacitance will be lower. This actually provides an inherent advantage of the invention, since most applications of variable, vacuum capacitors require lower voltage ratings at high values of capacitance and higher voltages at the lower capacity values.

While the plates 22, 54 of the illustrated capacitor are plane surfaced it will be apparent that other configurations are possible. The opposed surfaces may, for example, be complementary hemispherical, conical or similar shape wherein the surfaces extend transversely of the axis of movement of the plates. In such cases the capacitor would have modified characteristics possessing characteristics of fixed area, variable spacing capacitors, such as the preferred embodiment illustrated, and fixed spacing, variable area capacitors.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. A variable, vacuum capacitor comprising an evacuated envelope comprising a tubular, glass wall portion, a pair of tubular glass-to-metal seal elements sealed one to each of the opposite ends of said glass wall portion, a first mounting member comprising an annular disc-like portion secured at its outer edge to one of said elements and a flange portion extending inwardly of said envelope from the inner edge of said annular portion coaxially of said glass wall portion, a fixed capacitor plate comprising a relatively thick conductive body having flat, parallel opposed faces extending at right angles to the axis of said envelope wall portion, said flange portion being hermetically secured at its inner end to one edge of said capacitor body, a second mounting member comprising an annular, disc-like portion secured at its outer edge to the other of said glass-to-metal seal elements, a movable capacitor plate comprising a relatively thick conductive body having a flat face opposed to the inner face of said fixed plate, a movable capacitor plate support comprising a circular base portion, sealed to the inner edge of said last mentioned disc-like portion, and a tubular guide portion extending coaxially of said base portion inwardly of said envelope, a bellows surrounding said guide portion and coaxial thereto, said bellows being sealed at one end to said movable capacitor plate and at its other end to said movable capacitor plate support base portion, a support rod slidably mounted within said guide portion and secured at one end to said movable capacitor plate, a cup-shaped cap secured at its periphery to said second mounting member, and an adjusting element operatively arranged between said cap and said rod for axially moving said rod and said movable capacitor plate.

2. A variable, vacuum capacitor comprising an evacuated enevelope including a tubular glass wall portion, a pair of tubular, metal elements sealed one to each of the opposite ends of said wall portion, a pair of annular outer, metal, plate-like rings secured at their outer edges one to each of the outer ends of said metal elements, each of said rings having an integral, axially parallel, outwardly extending flange at its inner peripheral edge, a fixed capacitor plate comprising a substantially cylindrical metal body having opposite, flat end faces, a first mounting ring securing said fixed capacitor plate to one of said outer rings, said first mounting ring comprising an annular plate portion coplanar with one of said outer rings and having an outwardly extending flange along its outer edge engaging and hermetically sealed to the said flange of said one outer ring, and an inwardly extending flange along its inner peripheral edge fixedly sealed to an edge of said fixed capacitor plate, a movable capacitor plate comprising a generally cylindrical body having a flat end face opposing and parallel to the inward end face of said fixed capacitor plate, a guide element comprising an annular base portion coplanar with the other of said outer rings and having an outwardly extending flange along its outer edge engaging and hermetically sealed to the said flange of said other outer ring, said guide element including an integral, elongated, tubular guide portion extending inwardly of said envelope coaxially of said wall portion, a bellows concentric of said guide portion sealed at one end to said guide element base portion and at its other end to said movable capacitor plate, a metal operating rod secured to said movable capacitor plate and slidable in said guide portion, a cup-shaped metal cap secured at its open edge to said guide element base portion, and means operatively connected between said cap and rod for effecting axial movement of the latter to move said movable electrode toward and away from said fixed electrode.

3. A variable, vacuum capacitor comprising an evacuated envelope comprising a tubular, glass wall portion, a fixed electrode comprising a relatively thick metal body sealed to one end of said wall portion and defining an end wall of said envelope, said body having an inner flat face extending perpendicularly to the axis of said wall portion, a movable electrode comprising a relatively thick metal body having a flat face opposed to the inner face of said fixed electrode and parallel thereto, a movable electrode support comprising a circular metallic base portion, sealed to the opposite end of said tubular wall portion and defining an end wall of said envelope, a rigid tubular metallic guide portion fixed to and extending coaxially of said base portion inwardly of said envelope, a bellows surrounding said guide portion and coaxial thereto, said bellows being sealed at one end to said movable electrode and at its other end to said electrode support base portion, a metal support rod slidably mounted within said guide portion and secured at one end directly to said movable electrode, and means for effecting axial movement of said rod to effect movement of said movable electrode toward and from said fixed electrode.

4. In a variable, vacuum capacitor, a pair of parallel faced opposed capacitor plates, means for moving said plates towards or away from one another, and a cylindrical stop element of insulating material mounted in one of said plates projecting beyond the face thereof so as to engage the other of said plates at a predetermined minimum spacing therebetween, said one plate having a recess in the surface thereof immediately adjacent said stop element extending peripherally of said stop element.

References Cited in the file of this patent
UNITED STATES PATENTS

| | | |
|---|---|---|
| 2,867,758 | Wilstead | Jan. 6, 1959 |
| 3,040,220 | Neibaur | June 19, 1962 |

UNITED STATES PATENT OFFICE
CERTIFICATE OF CORRECTION

Patent No. 3,161,812                      December 15, 1964

John T. Perry et al.

It is hereby certified that error appears in the above numbered patent requiring correction and that the said Letters Patent should read as corrected below.

Column 1, line 34, strike out "stop 27 when the electrode spacing is in the" and insert instead -- fixed plate. The movable plate is sealed to --; column 3, line 28, for "the" read -- them --.

Signed and sealed this 13th day of April 1965.

(SEAL)
Attest:

ERNEST W. SWIDER                      EDWARD J. BRENNER
Attesting Officer                       Commissioner of Patents